March 9, 1965 H. I. HANSEN 3,172,437
TILTABLE SAW
Filed May 16, 1963 2 Sheets-Sheet 1

INVENTOR.
HARRY I. HANSEN
BY
Delman H. Jansen
AGENT

March 9, 1965  H. I. HANSEN  3,172,437
TILTABLE SAW
Filed May 16, 1963  2 Sheets-Sheet 2
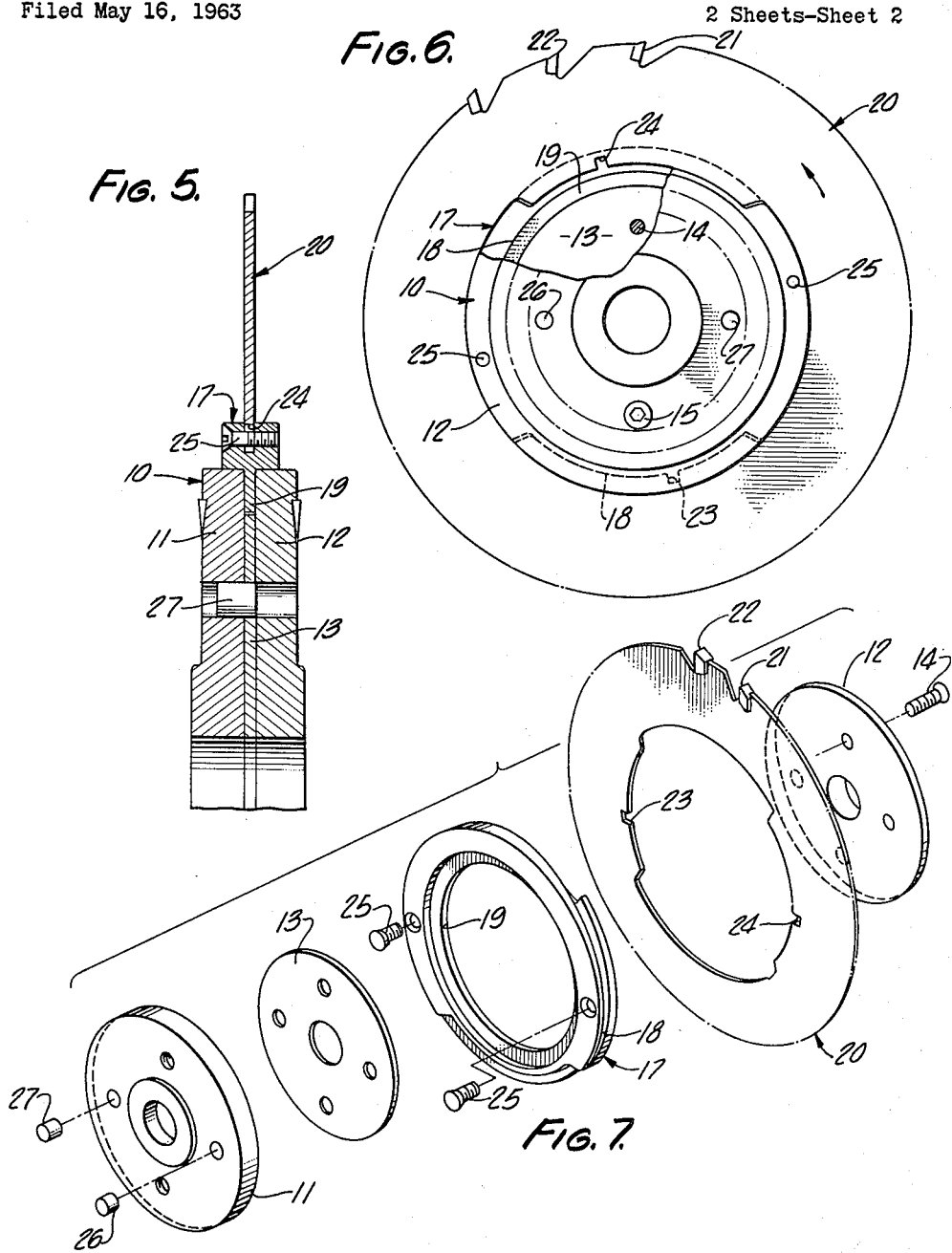
INVENTOR.
HARRY I. HANSEN
BY
AGENT

United States Patent Office 3,172,437
Patented Mar. 9, 1965

3,172,437
TILTABLE SAW
Harry I. Hansen, 2118 N. Frontage Road, Turlock, Calif.
Filed May 16, 1963, Ser. No. 280,896
1 Claim. (Cl. 144—238)

This invention relates to tiltable saws, sometimes known as dado saws, of the circular type.

In working and milling wood, plastics, soft metals, and the like, it is often essential to have a circular saw which can be adjusted so as to produce a cut or groove of variable width. This is frequently accomplished by a mechanical arrangement which permits the axis of the circular saw to be tilted with respect to the axis of the shaft or arbor which carries the saw. When the two axes coincide, the width of the cut or groove or slot made by the saw is essentially the same as the thickness of the cutting edge of the saw blade; but as the two axes are caused to diverge, the width of the cut becomes greater, since the saw "wobbles" as the shaft rotates.

Arrangements for clamping a saw in the variable fashion just described are known, and indeed, the art goes back many years. In spite of the antiquity of the broad idea, however, inventive effort continues to be directed to this problem, because the devices already known for the purpose fall considerably short of the ideal. A suitable saw of the type described should exhibit good dynamic balance regardless of the angle of tilt; it should be easily changed from one tilt to another, but should remain positively locked in any desired position. The locking means must be certain and free from any likelihood of failure, and yet be readily releaseable for adjustments. The saw and all of its adjusting and movable parts should not be prone to clogging from the debris and dust caused by the cutting or sawing operation. The cutting part of the saw must be readily removable for purposes of sharpening and dressing and alignment of cutting edges, or for replacement with other types of cutters for operating on different types of material. Finally, the saw should present no protruding parts which might snag the clothing of the operator, or the work piece, or the like, other than, of course, the cutting blades themselves.

It is an object of the present invention to provide a saw having the desirable qualities mentioned above, viz., good dynamical balance, ready adjustability, certainty of locking in position, smooth exposed surfaces and parts, ready interchangeability and replacement, and simplicity of manufacture.

Other objects of the invention will appear as the description thereof proceeds.

In the drawings,

FIGURE 1 is a general view of an exemplary embodiment of my inventive saw, viewed from the side, i.e., from the axis of the shaft on which it is mounted.

FIGURES 2, 3, and 4 are side views, largely in section showing the saw in three different positions of adjustment.

FIGURE 5 is a detail sectional view, taken where shown by the arrows in FIGURE 1, of the saw.

FIGURE 6 is an end-on view, taken from the same position as FIGURE 1, showing the blade rotated for removal.

FIGURE 7 is an exploded view, in perspective, showing how the various parts of my saw are assembled.

Figure 1:
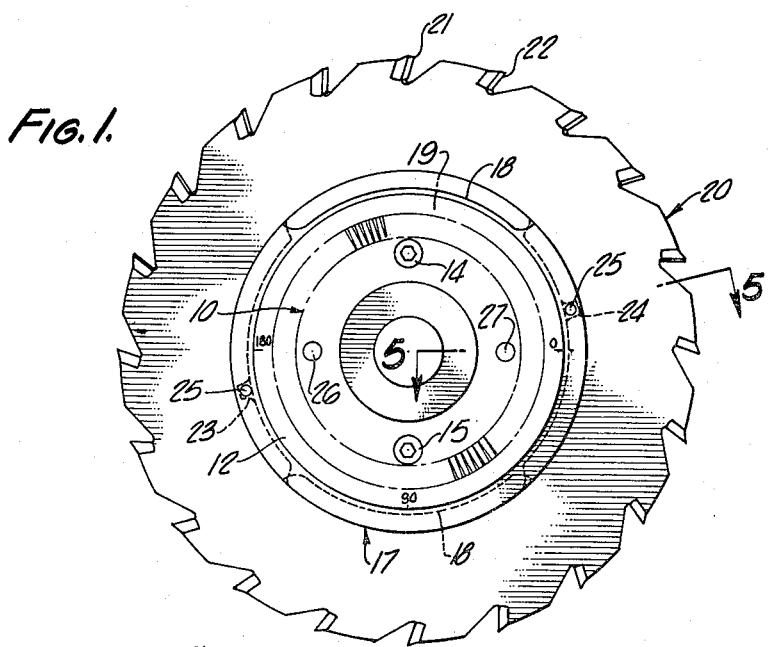

Generally speaking, and in accordance with an illustrative embodiment of my invention, I provide a mandrel body 10, which consists essentially of two similar halves, 11 and 12, with spacer ring 13 therebetween, held together by two screws 14 and 15. When the combined parts of this mandrel body are together, as shown, for example, in FIGURES 1-6 inclusive, the overall assembly may be considered to present substantially a solid of revolution, the axis of which coincides with the axis of the central hole of the mandrel body, and therefore with the axis of the shaft 16 on which the mandrel body may be mounted, except that the outer rim of the body lies in a cylindrical surface, the axis of which is at a slight angle to that of the shaft, as will appear. The spacer ring 13, however, is mounted at an angle which differs from 90° to the axis of the shaft, and thus defines a plane separating the two halves 11 and 12 of the mandrel body, which are closely similar, but which in the assembled position are mounted with one effectively rotated to a position 180° from the other, as is made clear from the figures, particularly, FIGURES 2, 3, 4, and 7. The normal to the plane of the spacer ring 13 is represented by the dashed line B—B¹ in FIGURE 2, and it may be remarked that the angle which this normal makes with the axis of the shaft A—A¹ is preferably one-half of the maximum angle of tilt of the saw, as will appear hereinbelow.

In order to facilitate the assembly of the mandrel body, I prefer to provide a pair of diametrically opposed locating pins 26 and 27, which are permanently engaged by a tight drive fit in mandrel half 11, while engaging suitably positioned holes in mandrel half 12 with a slight clearance, all as shown in the drawings, and in particular, in FIGURES 1, 5, 6, and 7.

Surrounding the mandrel body and partly contained within it is an adapter ring 17, the configuration of which may be seen in the drawings. It consists essentially of an annular body part 17 in which a slot 18 has been milled, this slot 18 being all in one plane, which, however, is tilted somewhat with respect to the plane defined by the adapter ring 17 proper, again as is clear from the drawings. The adapter ring also bears an inner lip 19 which again is all in one plane, and the plane of which is co-planar with the adapter ring 17 proper, again as may be seen from the drawings. The thickness of the inner lip 19 is slightly greater than the thickness of spacer ring 13, so that when the two halves of the mandrel body 11 and 12 are brought together by locking screws 14 and 15, the adapter ring lip 19 is firmly clamped thereby. Indeed, the spacer ring 13 may be omitted, but is a convenient aid in the assembly process.

In the embodiment which I prefer, adapter ring 17 has its sides relieved in part for approximately 90° on each side, the 90° relief of one side, shown directly near the top of FIGURE 1, being diametrically opposite the approximately 90° relief on the other side, shown in phantom view near the bottom of FIGURE 1. The manner of relieving or cutting away the sides of adapter ring 17 is also shown in detail in FIGURES 6 and 7.

The slot 18 of adapter ring 17 in turn bears the saw blade 20 which is provided with a multiplicity of cutting edges 21, 22, etc. While the cutting edges may be formed integrally from the material of the saw blade itself, I prefer to provide separate inserts 21, 22, etc., welded to the annular saw 20. These inserts are preferably made from extremely tough and hard materials such as silicon carbide. For various classes of use, the inserts, of course, may be of other material, such as boron nitride, diamond, the recently developed ceramic cutting materials, and the like.

The annular saw blade 20 has an outer diameter defined by the outermost projections of the cutting edges 21, 22, etc., and has an inner diameter of which is just sufficiently larger than the diameter of the base of slot 18 in adapter ring 17 to provide a snug fit in this groove, without excessive radial play. A suitable tolerance in manufacture is two mils on the radius, although obviously this is capable of considerable variation depending on the class of workmanship desired and the nature of the work to be performed by the saw. The saw blade 20 is relieved from its inner diameter at two diametrically opposed portions, each having an arc length of about slightly in excess of 90°. The extent of the relief or cutting away is sufficient to clear the wall of adapter ring 17, as is clear especially from FIGURES 1, 6, and 7. In mounting saw blade 20 on adapter ring 17, one lip is hooked over the bottom edge of the ring, whereupon the saw blade 20 may be tilted back so that the plane of the saw blade 20 coincides with the plane of slot 18. At this stage, the configuration is then as shown in FIGURE 6. Then the circular saw 20 is rotated, for example, as shown by the arrows in FIGURE 6, so that the relieved parts of saw blade 20 entirely clear the relieved parts of the side walls of adapter ring 17. The tiltable saw then presents the configuration shown in FIGURE 1, and, for that matter, in FIGURES 2–5 inclusive. I prefer to provide a pair of notches 23 and 24 in the unrelieved part of saw blade 20, so that when the saw blade is in place on the adapter ring as shown in FIGURE 1, these notches are aligned with corresponding screws in the adapter ring, to receive blade lock screws 25, in order to lock the saw blade in place with respect to adapter ring 17.

It will now be apparent that if clamping screws 14 and 15 are loosened so as to permit adapter ring 17 to rotate with respect to the mandrel body, then as the rotation is carried through 180°, the normal to the circular saw 20 will make an angle with the axis of the shaft A—A$^1$ varying from zero to a value which may be approximately twice that of the tilt of the plane of spacer ring 13 from the axis of the shaft, as hereinabove described.

Figure 2:
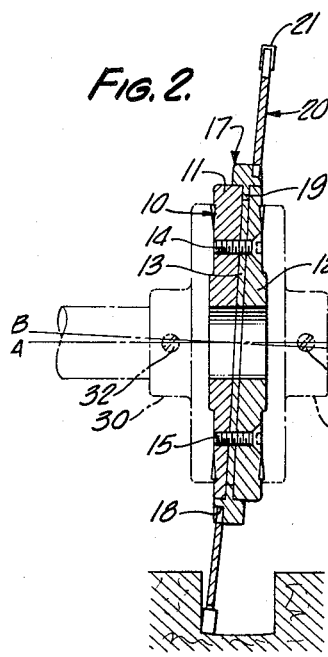
Figure 3:
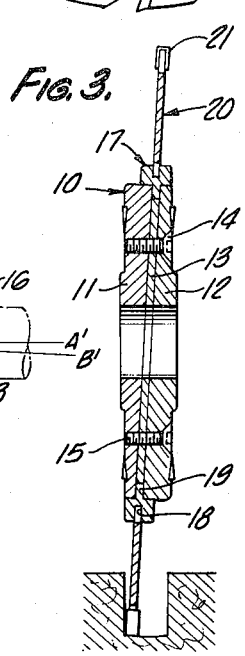
Figure 4:
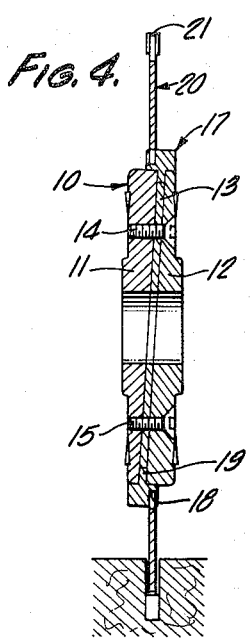

In FIGURE 2, the saw is shown in the configuration wherein the two tilts are additive, so that the annular saw blade 20 presents a maximum tilt to the axis of the shaft. FIGURE 3 shows the configuration when the adapter ring 17 has been rotated 90° from its position as shown in FIGURE 2. In this tilt position, the resulting tilt of circular saw blade 20 is reduced to one-half of the value shown in FIGURE 2. In FIGURE 4, the configuration is shown wherein the adapter ring 17 has been rotated an additional 90°, making a total of 180° from the position shown in FIGURE 2. In this condition, the tilt of annular saw blade 20 with respect to adapter ring 17, so that the annular saw blade 20 is now at right angles to the axis of the shaft, as appears clearly from FIGURE 4.

It will be observed that I make the mandrel assembly 11, 12, 13, quite massive with respect to the adapter ring 17 and circular saw blade 20, so that the dynamical balance of the whole assembly is changed only negligibly by rotation to the different positions shown. This makes for very great smoothness of operation, even for rotation at very high speeds, with the annular saw blade 20 in its maximum tilt position.

The mandrel body can be attached to a shaft in any desired fashion. For example, either half, 11 or 12, may be welded to a shaft, leaving the unwelded half free to slide thereon. Again, clamp plates of conventional construction, 30 and 31, may be engaged by the shaft by set screws 32 and 33, so as to secure the mandrel body to a shaft by side friction, as shown in FIGURE 2. Of course, any other means desired which will secure at least one half of the mandrel body to a shaft or other rotating body may be used.

While my invention has been described by the aid of specific examples, it will be evident that considerable variation is possible in choice of materials, detailed points of design, proportions, and the like, all within the broad scope of the invention, as defined by the claim which follows.

The usual and preferred material of construction for my saw is steel, with the exception of the cutting teeth, as mentioned hereinabove. Stainless varieties of steel may be employed for special purposes, when desired.

Having described the invention, I claim:

A dado saw, comprising, in combination: a mandrel body consisting essentially of a first half and a second half, said two halves being juxtaposed so as to form a mandrel body essentially symmetrical about a central axis of rotation, having an outer rim contained in a cylindrical surface the axis of which is set at an angle with respect to said axis of rotation, and presenting a peripheral slot formed between the two halves in a plane normal to the axis of said cylindrical surface; an adapter ring having an inner rim which bears against said mandrel rim and an inner lip engaged by said slot of said mandrel body and also having annular saw blade engaging means comprising an outwardly directed slot formed between two side walls, one of which is cut away for an arc of about 90°, and the other of which is cut away for an arc of about 90° diametrically opposed to said first arc; and an annular saw blade including cutting serrations on its periphery engaged by said engaging means, said saw blade having an inner rim which seats in said saw blade engaging means slot, said inner rim being cut away for two diametrically opposed arcs of about 90° sufficiently to clear the said side walls; and detent means for restraining said saw blade from rotation in said slot.

References Cited by the Examiner

UNITED STATES PATENTS

| 411,189 | 9/89 | Grey | 143—139 |
| 1,325,900 | 12/19 | Mouche | 144—238 |
| 2,665,722 | 1/54 | Edgemond | 144—238 |

FOREIGN PATENTS 2,977 of 1895  2/95  Great Britain.

WILLIAM W. DYER, Jr., *Primary Examiner.*

DONALD R. SCHRAN, *Examiner.*